US012712279B2

(12) United States Patent
Chen et al.

(10) Patent No.: US 12,712,279 B2
(45) Date of Patent: Aug. 18, 2026

(54) BASE STATION ANTENNA ASSEMBLY AND PRINTED CIRCUIT BOARD USED IN BASE STATION ANTENNAS

(71) Applicant: Outdoor Wireless Networks LLC, Claremont, NC (US)

(72) Inventors: Changfu Chen, Suzhou (CN); Bin Sun, Suzhou (CN); Pengfei Guo, Suzhou (CN); Jian Zhang, Suzhou (CN); Cheng Xue, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 248 days.

(21) Appl. No.: 18/754,420

(22) Filed: Jun. 26, 2024

(65) Prior Publication Data

US 2025/0007173 A1 Jan. 2, 2025

(30) Foreign Application Priority Data

Jun. 27, 2023 (CN) ......................... 202310764634.3

(51) Int. Cl.

| | |
|---|---|
| ***H01Q 9/46*** | (2006.01) |
| ***H01Q 1/24*** | (2006.01) |
| ***H01Q 15/14*** | (2006.01) |
| ***H01Q 21/26*** | (2006.01) |
| ***H04B 7/0495*** | (2017.01) |

(52) U.S. Cl.

CPC ............... *H01Q 9/46* (2013.01); *H01Q 1/246* (2013.01); *H01Q 21/26* (2013.01); *H01Q 15/14* (2013.01)

(58) Field of Classification Search

CPC .......... H01Q 9/46; H01Q 1/246; H01Q 21/26; H01Q 15/14; H01Q 5/42; H01Q 1/36; H01Q 1/48; H01Q 1/50; H01Q 15/24; H05K 1/0296

See application file for complete search history.

(56) References Cited

U.S. PATENT DOCUMENTS 10,924,169 B2 * 2/2021 Bisiules .................... H01Q 5/42

11,646,502 B2 * 5/2023 An ..................... H01Q 21/0006 343/702

(Continued)

*Primary Examiner* — Dominic E Rego

(74) *Attorney, Agent, or Firm* — Myers Bigel, P.A.

(57) ABSTRACT

The present invention relates to base station antenna assembly. a base station antenna assembly including a reflector; a first radiator; a second radiator; a feeder panel including a dielectric substrate and a conductor plane capacitively coupled with a ground plane formed on a rear surface of the dielectric substrate; a first feed path including a first feed line extending from the rear of the feeder panel to the front of the feeder panel and a second feed line formed on a front surface of the dielectric substrate; a second feed path including a first feed line extending from the rear of the feeder panel to the front of the feeder panel and a second feed line formed on a front surface of the dielectric substrate; and a gap resonator deposited between the first feed line of the first feed path extending to the front of the feeder panel and the first feed line of the second feed path extending to the front of the feeder panel, and the gap resonator being configured to resonate at the first frequency, wherein the first frequency is within the operating frequency bands of the first and second radiators.

21 Claims, 10 Drawing Sheets

(56) References Cited

U.S. PATENT DOCUMENTS

| | | | | |
|---|---|---|---|---|
| 11,695,197 | B2 * | 7/2023 | Lv | H01Q 1/246<br>343/702 |
| 11,941,194 | B2 * | 3/2024 | Kamiyama | G06F 3/0383 |
| 2005/0099350 | A1 * | 5/2005 | Gothard | H01Q 19/193<br>343/781 CA |
| 2007/0063902 | A1 * | 3/2007 | Leisten | H01Q 11/08<br>343/702 |
| 2017/0244159 | A1 * | 8/2017 | Moon | H01Q 5/42 |
| 2018/0269936 | A1 * | 9/2018 | Chen | H04Q 11/06 |
| 2019/0237851 | A1 * | 8/2019 | Gu | H01Q 5/35 |
| 2019/0288406 | A1 * | 9/2019 | Yang | H01Q 1/38 |
| 2020/0044320 | A1 * | 2/2020 | Han | H01Q 1/521 |
| 2020/0328503 | A1 * | 10/2020 | Li | H01Q 21/26 |
| 2020/0373668 | A1 * | 11/2020 | Wu | H01Q 9/285 |
| 2021/0021019 | A1 * | 1/2021 | Hou | H01Q 21/28 |
| 2021/0098864 | A1 * | 4/2021 | Zhang | H01Q 1/523 |
| 2021/0325981 | A1 * | 10/2021 | Park | G06F 3/03545 |
| 2022/0240371 | A1 * | 7/2022 | Balana Avila | H01R 4/64 |
| 2023/0017375 | A1 * | 1/2023 | Wu | H01Q 5/42 |
| 2023/0216197 | A1 * | 7/2023 | Chen | H01Q 1/246<br>343/702 |
| 2023/0288548 | A1 * | 9/2023 | Sanson | G01S 13/38 |
| 2024/0030591 | A1 * | 1/2024 | Liu | H01Q 3/06 |
| 2024/0213650 | A1 * | 6/2024 | Wang | H01Q 1/246 |
| 2024/0258684 | A1 * | 8/2024 | Wu | H01Q 19/108 |
| 2024/0283164 | A1 * | 8/2024 | Ai | H01Q 9/44 |

* cited by examiner

BASE STATION ANTENNA ASSEMBLY AND PRINTED CIRCUIT BOARD USED IN BASE STATION ANTENNAS

CROSS-REFERENCE TO RELATED APPLICATION

The present application claims priority from and the benefit of Chinese Patent Application No. 202310764634.3, filed Jun. 27, 2023, the disclosure of which is hereby incorporated herein by reference in full.

FIELD OF THE INVENTION

The present invention relates to wireless communication systems, and more particularly, to base station antenna assembly and printed circuit board used in base station antennas.

BACKGROUND OF THE INVENTION

Wireless base stations are well known in the art, and generally include baseband units, radio units, base station antennas and other components. Base station antennas are configured to provide bidirectional radio frequency ("RF") communication with stationary and mobile subscribers ("users") located throughout the cell. Generally, base station antennas are installed on towers or raised structures such as poles, roofs, water towers, etc., and separate baseband units and radio units are connected to the base station antennas.

FIG. 1 is a schematic diagram of a base station 90. The base station 90 includes a base station antenna 95 that can be mounted on the protruding structure 94. The base station 90 also includes base station devices such as the baseband unit 91 and the radio unit 92. In order to simplify the drawing, a single baseband unit 91 and a single radio unit 92 are shown in FIG. 1. However, it should be understood that more than one baseband unit 91 and/or radio unit 92 may be provided. In addition, although the radio unit 92 is shown as being co-located with the baseband unit 91 at the bottom of the protruding structure 94, it should be understood that in other cases, the radio unit 92 may be a remote radio head (RRH) mounted on the protruding structure 94 adjacent to the base station antenna 95. The baseband unit 91 can receive data from another source, such as a backhaul network (not shown), and process the data and provide a data stream to the radio device 92. The radio unit 92 may generate RF signals including data encoded therein and may amplify and transmit these RF signals to the base station antenna 95 through a radio frequency cable 93 (e.g. a coaxial transmission cable). It should also be understood that the base station 90 of FIG. 1 may generally include various other devices (not shown), such as a power supply, a backup battery, a power bus, an antenna interface signal group (AISG) controller, and the like.

Generally, a base station antenna includes one or a plurality of phased arrays of radiating elements, wherein the radiating elements are arranged in one or a plurality of columns when the antenna is installed for use. In order to transmit and receive RF signals to and from the defined coverage area, the antenna beam of the base station antenna 95 is usually inclined at a certain downward angle with respect to the horizontal plane (referred to as a "downtilt"). In some cases, the base station antenna 95 may be designed so that the "electronic downtilt" of the antenna base station antenna 95 can be adjusted from a remote location. With the base station antenna 95 including such an electronic tilt capability, the physical orientation of the base station antenna 95 is fixed, but the effective tilt of the antenna beam can still be adjusted electronically, for example, by controlling a phase shifter that adjusts the phase of signals provided to each radiating element of the base station antenna. The phase shifter and other related circuits are usually built in the base station antenna 95 and can be controlled from a remote location. Typically, an AISG control signal is used to control the phase shifter.

Many different types of phase shifters are known in the art, including rotary wiper arm phase shifters, trombone style phase shifters, sliding dielectric phase shifters, and sliding metal phase shifters. The phase shifter is usually constructed together with the power divider as a part of the feeding network (or feeder component) for feeding the phased array. The power divider divides the RF signal input to the feed network into a plurality of sub-components, and the phase shifter applies a changeable respective phase shift to each sub-component so that each sub-component is fed to one or a plurality of radiators.

SUMMARY OF THE INVENTION

One of the purposes of the present invention is to provide a base station antenna assembly and a printed circuit board used in the base station antenna.

According to a first aspect of the present disclosure, a base station antenna assembly is provided, comprising: a reflector configured to provide a ground plane; a first radiator positioned forward of the reflector, the first radiator configured to send and receive electromagnetic radiation within the first frequency band; a second radiator positioned forward of the reflector, the second radiator configured to send and receive electromagnetic radiation within the first frequency band; a feeder panel positioned between the reflector and the first radiator and between the reflector and the second radiator, the feeder panel consisting of a dielectric substrate and a conductor plane formed on a rear surface of the dielectric substrate that is capacitively coupled to the ground plane; a first feed path configured to feed a first radio frequency signal to a first radiator, the first feed path comprising a first feed line extending from the rear of the feeder panel to the front of the feeder panel and a second feed line formed on the front surface of the dielectric substrate; a second feed path configured to feed a second radio frequency signal to a second radiator, the second feed path comprising a first feed line extending from the rear of the feeder panel to the front of the feeder panel and a second feed line formed on the front surface of the dielectric substrate; and a gap resonator positioned between a portion of the first feed line extending to the front of the feeder panel of the first feed path and a portion of the first feed line extending to the front of the feeder panel of the second feed path, and the split resonator configured to resonate at the first frequency, where the first frequency is located in the first frequency band.

According to a second aspect of the present disclosure, a base station antenna assembly is provided, comprising: a grounded reflector; a grounded first housing positioned rearward of the reflector; a grounded second housing positioned rearward of the reflector; a first conductive wire comprising a first portion positioned inside the first housing and a second portion extending outside the first housing, the first portion of the first conductive wire configured to form a first stripline transmission wire with the first housing; a second conductive wire comprising a first portion positioned inside the second housing and a second portion extending outside the second housing, the first portion of the second conductive wire configured to form a second stripline transmission wire with the second housing; a feeder panel positioned forward of the reflector, the feeder panel comprising a dielectric substrate and a grounded conductor plane formed on a rear surface of the dielectric substrate, and positioned in front of the reflector, wherein the second portion of the first conductive wire passes through the reflector and the feeder panel and extends to the front of the feeder panel, and the second portion of the second conductive wire passes through the reflector and the feeder panel and extends to the front of the feeder panel, a gap formed on the conductor plane between the second portion of the first conductive wire and the second portion of the second conductive wire.

According to a third aspect of the present disclosure, a base station antenna assembly is provided, comprising: a reflector configured to provide a ground plane; a first radiator positioned forward of the reflector, the first radiator configured to send and receive electromagnetic radiation within a first frequency band; a second radiator positioned forward of the reflector, the second radiator configured to send and receive electromagnetic radiation within the second frequency band, and the first frequency band and the second frequency band overlapping within a third frequency band; a first housing grounded rearward of the reflector; a second housing grounded rearward of the reflector; a first conductive wire for feeding to the first radiator, comprising the first portion positioned inside the second housing and the second portion passing through the reflector and extending to the front of the reflector, wherein the first portion of the second conductive wire is configured to form a second stripline transmission line together with the second housing; and a decoupling unit positioned forward of the reflector and between the second portion of the first conductive wire and the second portion of the second conductive wire, and the decoupling unit configured to decouple at least in the third frequency band between the second portion of the first conductive wire and the second portion of the second conductive wire.

According to a fourth aspect of the present invention, a printed circuit board used in a base station antenna is provided, the printed circuit board positioned forward of a reflector of the base station antenna and positioned rearward of a bipolar radiation element of the base station antenna, the printed circuit board comprising: a media substrate; a first conductive trace and a second conductive trace formed on a front surface of the media substrate, the first conductive trace being used to feed a first polarized radiator of the bipolar radiation element and the second conductive trace being used to feed a second polarized radiator of the bipolar radiation element; a conductor plane formed on a rear surface of the media substrate, wherein a gap is formed in the conductor plane, the gap extending between the first and second conductive traces.

Other features and advantages of the present disclosure will be made clear by the following detailed description of exemplary examples of the present disclosure with reference to the attached drawings.

BRIEF DESCRIPTION OF THE DRAWINGS

The attached drawings, which form a part of the Specification, describe examples of the present disclosure and, together with the Specification, are used to explain the principles of the present disclosure.

Figure 1:
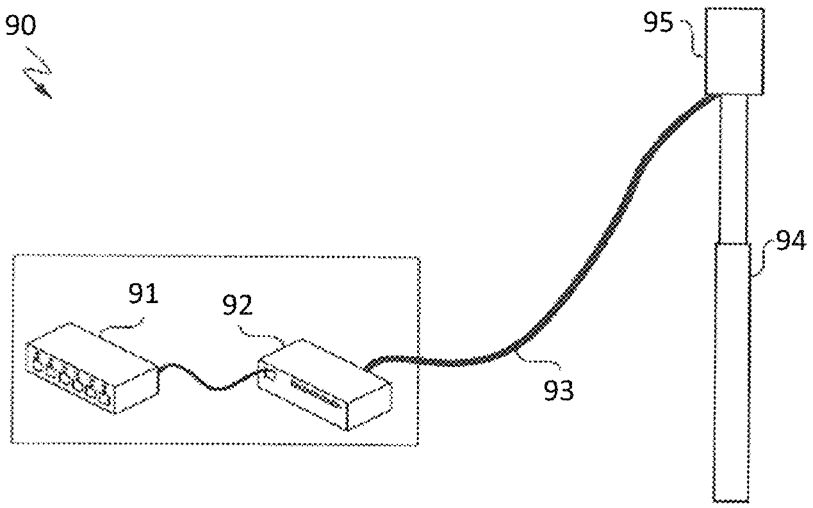
FIG. 1 is a schematic diagram of a base station.

Note, in the embodiments described below, the same reference signs are sometimes jointly used between different attached drawings to denote the same parts or parts with the same functions, and repeated descriptions thereof are omitted. In some cases, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like may not indicate the actual position, dimension, and range. Therefore, the present disclosure is not limited to the position, size, range, etc. disclosed in the attached drawings.

DETAILED DESCRIPTION OF SPECIFIC EMBODIMENTS

The present disclosure will be described below with reference to the attached drawings, which show several examples of the present disclosure. However, it should be understood that the present disclosure can be presented in many different ways and is not limited to the examples described below. In fact, the examples described below are intended to make the present disclosure more complete and to fully explain the protection scope of the present disclosure to those skilled in the art. It should also be understood that the examples disclosed in the present disclosure may be combined in various ways so as to provide more additional examples.

It should be understood that the terms used herein are only used to describe specific examples, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described as "directly" "on" another element, "directly attached" to another element, "directly connected" to another element, "directly coupled" to another element or "directly in contact with" another element, there will be no intermediate elements. As used herein, when one feature is arranged "adjacent" to another feature, it may mean that one feature has a part overlapping with the adjacent feature or a part located above or below the adjacent feature.

In this specification, elements, nodes or features that are "coupled" together may be mentioned. Unless explicitly stated otherwise, "coupled" means that one element/node/feature can be mechanically, electrically, logically or otherwise connected to another element/node/feature in a direct or indirect manner to allow interaction, even though the two features may not be directly connected. That is, "coupled" is intended to comprise direct and indirect connection of components or other features, including connection using one or a plurality of intermediate components.

As used herein, spatial relationship terms such as "upper", "lower", "left", "right", "front", "back", "high" and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features. The device may also be oriented by other means (rotated by 90 degrees or at other positions), and at this time, a relative spatial relation will be explained accordingly.

As used herein, the term "A or B" comprises "A and B" and "A or B", not exclusively "A" or "B", unless otherwise specified.

As used herein, the term "exemplary" means "serving as an example, instance or explanation", not as a "model" to be accurately copied. Any realization method described exemplarily herein may not be necessarily interpreted as being preferable or advantageous over other realization methods. Furthermore, the present disclosure is not limited by any expressed or implied theory given in the above technical field, background art, summary of the invention or specific embodiments.

As used herein, the word "basically" means including any minor changes caused by design or manufacturing defects, device or component tolerances, environmental influences, and/or other factors. The word "basically" also allows for the divergence from the perfect or ideal situation due to parasitic effects, noise, and other practical considerations that may be present in the actual realization.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

Figure 2A:
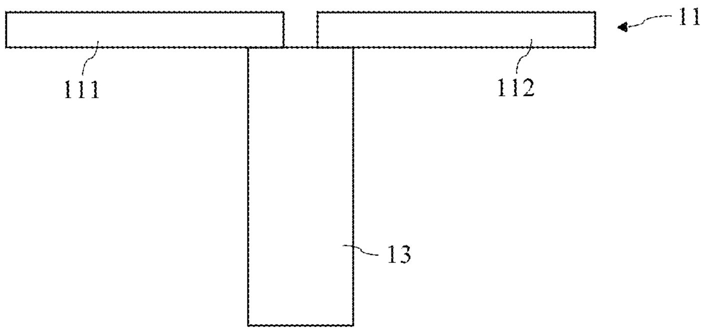
FIGS. 2A and 2B are schematic diagrams of radiators and radiating elements of the present disclosure.
Figure 2B:
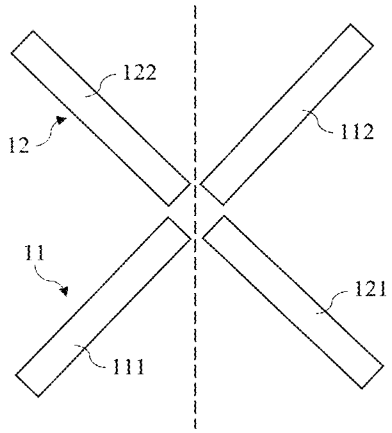

With reference to FIGS. 2A and 2B, as used herein, unless otherwise specified, "radiator" refers to a radiator including one or plurality of radiating arms, such as the dipole radiator 11 comprising radiating arms 111 and 112 shown in FIG. 2B, including the dipole radiator 12 comprising radiating arms 121 and 122. Unless otherwise specified, "radiation element" refers to the radiator and its supporting/feeding elements. For example, as shown in FIG. 2A, the radiation elements comprise a radiator 11 and the supporting/feeding element 13 for the radiator 11. The "bipolar radiation element" referred to herein includes two radiation elements arranged orthogonal to one another. For example, a cross-dipole radiation element may be in an "X-shaped" or "cross" arrangement, or a box bipolar radiation element in a rectangular arrangement. A front view of the cross-dipole radiation element in an "X-shaped" arrangement, as shown in FIG. 2B, includes a radiator 11 inclined by +45 degrees relative to the center line (dashed lines in the figure, e.g., may be longitudinal axes of the base station antenna) and its supporting/feeding elements (not shown) and a radiator 12 inclined by −45 degrees and its supporting/feeding elements (not shown).

Figure 3:
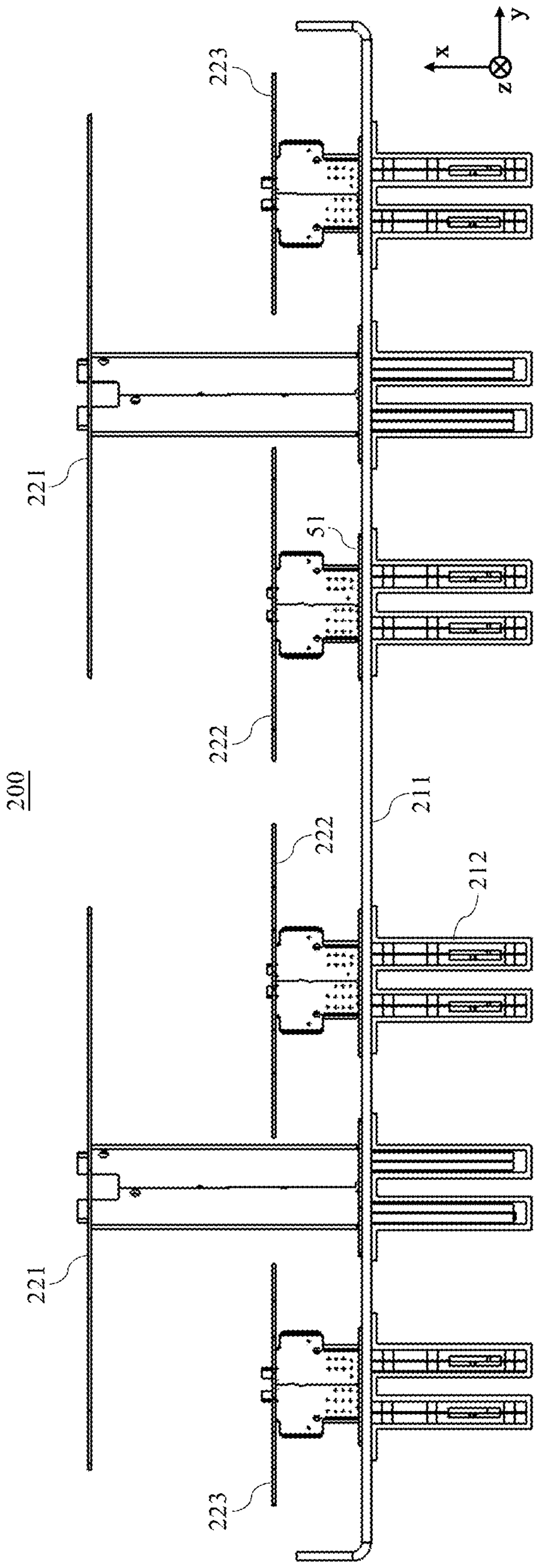
FIG. 3 is a bottom view of a base station antenna assembly according to an example of the present disclosure.

FIG. 3 shows the base station antenna assembly 200 in a bottom view, according to an example of the present disclosure. The base station antenna assembly 200 includes a reflector 211, a plurality of bipolar radiating elements 221, 222, and 223 installed to extend forward from the front surface of the reflector 211, and a plurality of housing elements 212 located on the rear surface of the reflector 211. The reflector 211 may be configured to include a metal plate extending substantially along an entire length of the base station antenna assembly 200 (the longitudinal dimension, illustrated in the z-axis direction) and substantially along an entire width (the horizontal dimension, illustrated in the y-axis direction) of the base station antenna assembly 200. The reflector 211 provides a ground plane, such as an outer conductor that may be coupled by current to a coaxial transmission line for transmission between the base station antenna and the radio unit.

The radiators of each of the radiation elements 221, 222, and 223 are positioned at a particular location in front of the reflector 211 through the support of the respective radiation element. In the illustrated example, the radiation element includes a radiation element 221 that operates within a lower frequency band (e.g., sending and receiving electromagnetic radiation), a radiation element 223 that operates within a higher frequency band, and a radiation element 222 that operates within an intermediate frequency band that is at least partially above the lower frequency band and at least partially below the higher frequency band. Since FIG. 3 is shown in a bottom view perspective, it will be understood that each of the radiation elements shown may correspond to a plurality of the same radiation elements arranged in a column along a longitudinal direction of the base station antenna.

The base station antenna assembly 200 also includes a plurality of feeder panels 51, each of the radiant elements 221, 222, and 223 being mounted to the reflector 211 by being mounted on the feeder panel 51. The feeder panel 51 is positioned between the reflector 211 and a respective radiator of the feeder panel 51, such as fixed on a front surface of the reflector 211. The feeder panel 51 couples the RF signal to a radiator (via a support/feed of a respective radiation element) of the various radiation elements 221, 222, and 223 and to a radiant RF signal from the respective radiation elements 221, 222, and 223. Each feeder panel 51 may be used for one radiation element, or for a plurality of adjacent (e.g., 2 or 3) radiation elements in a column of radiation elements. The feeder panel 51 may be implemented as a printed circuit board (PCB), including a media substrate, a grounded conductor plane formed on a rear surface of the media substrate (e.g., by capacitive coupling to the reflector 211), and conductive traces formed on a front surface of the media substrate.

The feed path for feeding the RF signal to each of the radiation elements 221, 222, and 223 includes a first feed line extending from the rear of the reflector 211 to the front of the reflector 211 and a second feed line formed on the front surface of the media substrate of the feeder panel 51 (e.g., the aforementioned conductive traces) such that the first feed line feeds to the respective radiation feeder via the second feed line. The first feed line may be implemented, for example, as the conductive line 310 to be described below. The first feed line includes a first portion positioned rearward of the reflector 211 and a second portion positioned forward of the reflector 211. The housing element 212 is positioned rearward of the reflector 211, e.g., fixed on a rear surface of the reflector 211, and provides a chamber inside the reflector for receiving the first portion of the first feed line. The housing element 212 is configured to be grounded, such as capacitively coupled with a ground plane provided by the reflector 211, such that the housing element 212 and the first portion of the first feed line housed therein form a stripline transmission line to transmit RF signals. A second feed line formed on the front surface of the feeder panel 51 forms a microstrip transmission line with a grounded conductor plane formed on the rear surface of the feeder panel 51 to transmit the RF signal. A second portion of the first feed line extends outside of the housing element 212, through an opening on the reflector 211 to a front of the reflector 211, and through an opening on the feeder panel 51 to a front of the feeder panel 51. A second portion of the first feed line is coupled on the front surface of the feeder panel 51 with a second feed line current to form a feed path that feeds RF signals to each of the radiators of each of the radiation elements 221, 222, and 223.

Figure 4:
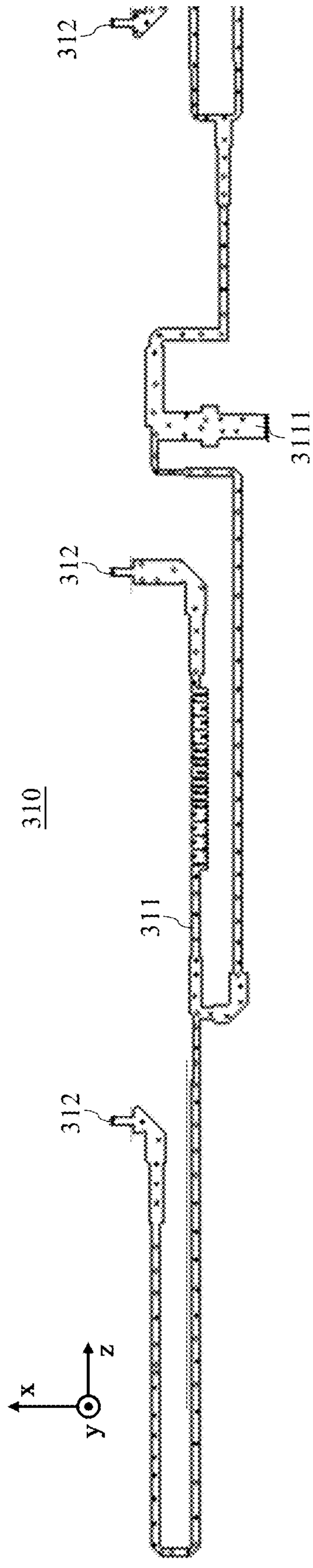
FIG. 4 is a side view of a portion of a first feed line in the base station antenna assembly of FIG. 3.

FIG. 4 is a side view of a portion of a first feed line in the base station antenna assembly 200, in which the first feed line is implemented as a stripline conductive wire 310 in this example. The conductive wire 310 extends along a longitudinal (z-axis direction) of the base station antenna assembly 200 in order to feed a radiator of a column of radiant elements. The conductive wire 310 includes a first portion 311 and a second portion 312. The first portion 311 is located rearward of the reflector 211 and is housed within a chamber provided by the housing element 212. The second portion 312 extends outside of the housing element 212, through an opening on the reflector 211 to a front of the reflector 211, and through an opening on the feeder panel 51 to a front of the feeder panel 51. The conductive wire 310 shown in FIG. 4 has a plurality of second portions 312 in its length direction (illustrated in the z-axis direction). Each second portion 312 extends forward of one corresponding feeder panel 51 to feed to a respective radiator (e.g., a radiator with a particular polarization direction) of one or more radiation elements mounted on that feeder panel 51. The first portion 311 has an input portion 3111 that can be electrically coupled to an inner conductor of a coaxial transmission line for transmission between a base station antenna and a radio unit so that an inputted RF signal can be received from the radio unit. The conductive wire 310 provides power dividers (power combiners in the receiving path of the antenna) from the input part 3111 to the plurality of output parts 312, and these power dividers are used to divide the RF signal inputted at the input part 3111 into a plurality of sub-components outputted through the respective output parts 312. Each second portion 312 is coupled to a radiator in a respective radiation element, such as via a first feed line on a feeder panel, thereby feeding a plurality of sub-components of the RF signal to a radiator in each of the radiation elements, respectively.

Figure 5A:
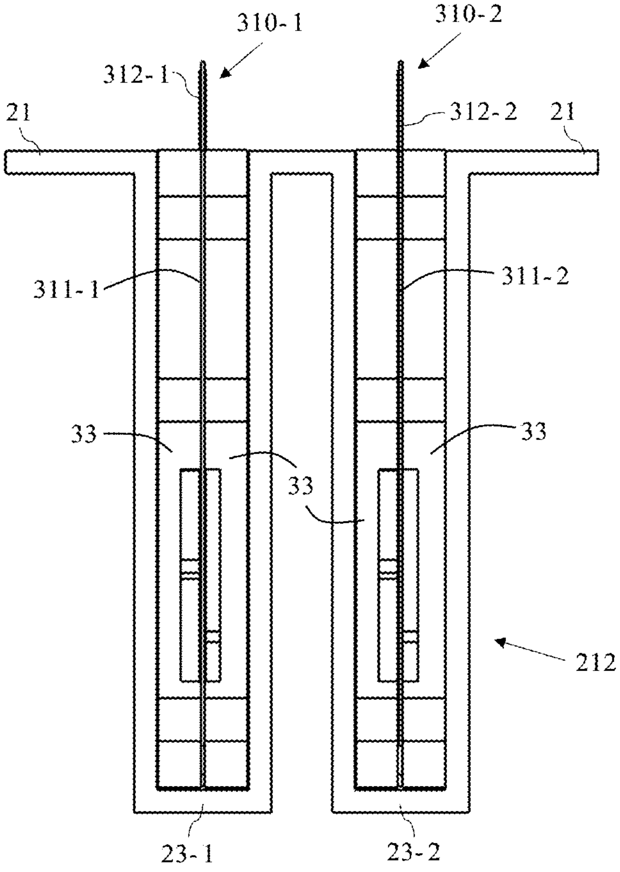
FIGS. 5A and 5B are enlarged views at a housing element of the base station antenna assembly of FIG. 3.
Figure 5B:
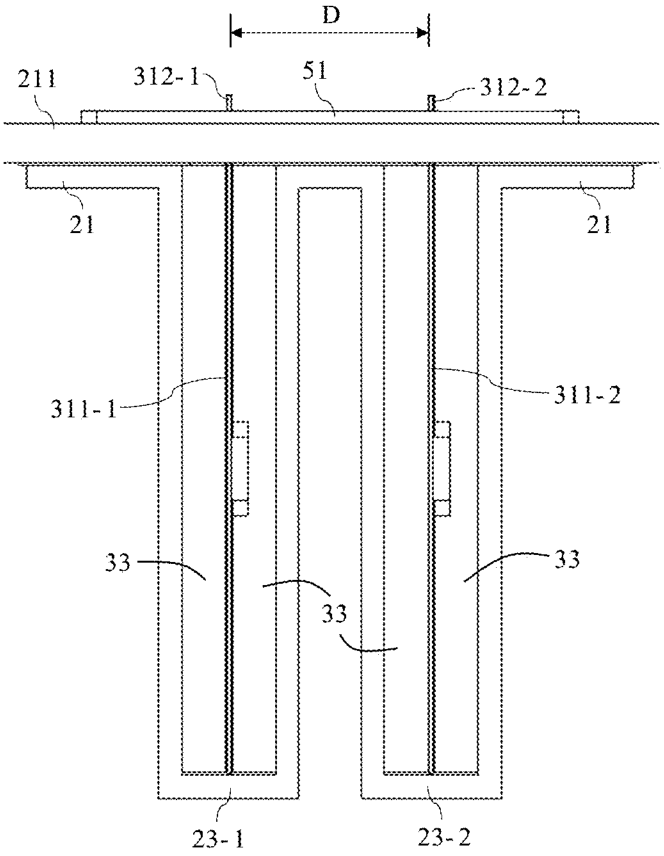

FIGS. 5A and 5B are enlarged bottom views at the housing element 212 of the base station antenna assembly 200 illustrating the first portion 311 of the conductive wire 310 being housed within a chamber provided by the housing element 212 and the second portion 312 of the conductive wire 310 extending forward of the feeder panel 51. The housing element 212 includes a housing 23-1 and a housing 23-2 that house a first portion 311-1 of the conductive wire 310-1 and a first portion 311-2 of the conductive wire 310-2, respectively. It should be noted that similar elements may be individually referred to by their complete drawing reference numerals (e.g., conductive wire 310-1) or collectively referred to by the first part of their drawing reference numerals (e.g., conductive wire 310). Each housing 23 includes two sidewalls extending rearwardly from the reflector 211 substantially perpendicular to the reflector 211, the two sidewalls being substantially parallel to the first portion 311 of the conductive line 310 housed therein. The housing element 212 also includes a coupling 21 extending substantially parallel to the reflector 211, the coupling 21 being capacitively coupled to the reflector 211 via an electromedia layer such that the housing element 212 is grounded such that two sidewalls of each housing 23 are grounded such that the first portion 311 of the two sidewalls of the housing 23 form a stripline transmission line with a conductive wire 310 located between the two sidewalls.

Figure 7:
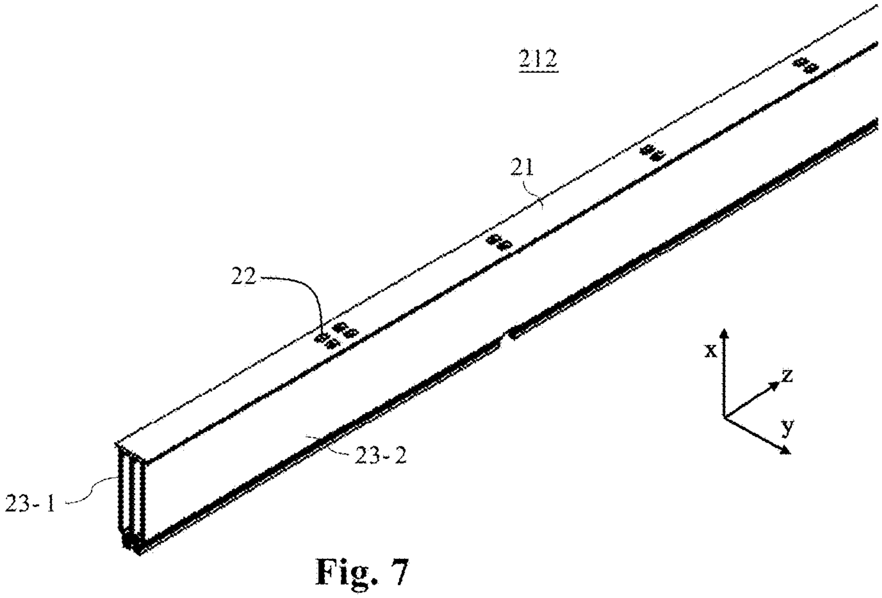
FIG. 7 is a perspective view of a portion of a housing element in the base station antenna assembly of FIG. 6.

The housing 23-1 and the housing 23-2 may be configured as an integral piece, i.e., the housing element 212. The entire housing element 212 may be integrally formed using a pultrusion process, e.g., of a metallic material (e.g., aluminum). In the illustrated example, the housing 23-1 and the housing 23-2 in the housing element 212 are configured to be separated from one another. In other examples, the housing 23-1 and the housing 23-2 in the housing element 212 may be configured as being adjacent, such as the sidewall of the housing 23-1 proximate the housing 23-2 and the sidewall of the housing 23-2 proximate the housing 23-1 being shared, as shown in FIG. 7.

It can be seen from the combination of FIGS. 5A and 5B with FIG. 3 that the conductive wires 310-1 and 310-2 are used to feed the radiators having a first polarization direction (e.g., inclined +45 degrees relative to the center line) and a second polarization direction (e.g., inclined −45 degrees), respectively, for the bipolar radiation element. Considering that each conductive wire 310 has a plurality of second portions 312 in its length direction as shown in FIG. 4, the conductive wire 310-1 is routed in a linear array for feeding a first polarization direction of a bipolar radiation element (e.g., radiation element 222 shown in FIG. 3), and the conductive wire 310-2 is routed in a linear array for feeding a second polarization direction of the bipolar radiation element (e.g., radiation element 222 shown in FIG. 3).

With continued reference to FIGS. 5A and 5B, in the interior chamber of the housing 23, there is also an electromedia element 33 between the conductive wire 310 and the sidewall of the housing 23. The dielectric element 33 includes a retaining element filled between the conductive wire 310 and the sidewall of the housing 23 to generally retain the conductive wire 310 in the middle of the chamber, which is useful where the conductive wire 310 is thinner and/or softer. In the stripline transmission lines, the higher the dielectric constants of the dielectric medium between the conductor belt (stripline conductive wire 310) and the grounding plate (two sidewalls of the housing 23), when the speed of RF signals transmitted on the conductor bands is lower, it is desirable that the retaining elements in the dielectric element 33 cover the conductive wire 310 as little as possible so that the dielectric medium between the conductive wire 310 and the sidewall of the housing 23 is as low as possible. For example, an opening may be constructed on the retaining element to reduce the coverage of the retaining element on the conductive wire 310. For example, the retaining element may be filled only between the dielectric substrate on which the conductive wire 310 depends (e.g., when the conductive wire 310 is a conductive trace on the PCB) and the sidewall of the housing 23 so that the retaining element may not substantially cover the conductive wire 310. Further, the dielectric element 33 may also include a motion element that is movable relative to the conductive wire 310 to adjust for a relative phase shift in the respective sub-components of the RF signal applied to the output through the conductive wire 310. The relative phase shift may be adjusted by varying the coverage area or length of the motion element on different portions of the conductive wire 310, such that the conductive wire 310 may be formed as a sliding media shifter integrated with the power dispenser. It will be understood that the retaining element may be provided with a displacement structure in a respective location to facilitate placement and movement of the movement element.

In some examples, the conductive wire 310 may be a conductive trace printed on a dielectric substrate. In these examples, to reduce the wear caused by the dielectric substrate (e.g., when the dielectric substrate is thicker), the conductive wire 310 may include a pair of lines printed on opposing surfaces of the dielectric substrate, respectively. The projection of the first line in this pair of lines on the dielectric substrate coincides fully with the projection of the second line in this pair on the dielectric substrate, i.e. the first line and the second line are symmetrical with respect to the plane in which the dielectric substrate is located. For example, a first line printed on a first surface of the dielectric substrate or a second line printed on a second surface of the dielectric substrate may be visible in FIG. 4. The first line and the second line are electrically connected through a conductive through hole (e.g., a plated through hole (PTH)) passing through the dielectric substrate. It should be understood that in other examples, the conductive wire 310 may be realized by sheet metal. In such examples, the conductive wire 310 may not be dependent on the dielectric substrate.

In other examples, the housing 23-1 and the housing 23-2 in the housing element 212 may be configured as adjacent and having a common sidewall, as shown in FIG. 7. In the example shown in FIG. 7, the front of the housing element 212 includes a coupling 21 that substantially completely covers the chamber provided by the housing 23-1 and the housing 23-2. The coupling 21 is formed as a metal plane extending substantially parallel to the reflector 211 so as to capacitively couple to the reflector 211 such that the housing element 212 is grounded. The coupling 21 substantially covers the chamber of the housing element 212, which may be substantially closed on the one hand, helping to improve the efficiency of the stripline transmission line in transmitting the RF signal; on the other hand, the coupling area between the coupling 21 and the reflector 211 may be as large as possible to ensure the coupling between the two ground elements. Further, to ensure the effectiveness of the ground connection, a current connection may also be provided between the reflector 211 and the housing element 212, such as welding the coupling 21 of the housing element 212 to the reflector 211 (e.g., to the opening 24 of the reflector 211) via conductive solder 25 as shown in FIG. 8, so that the ground potentials of the reflector 211 and the housing element 212 are as close or equal as possible.

Figure 6:
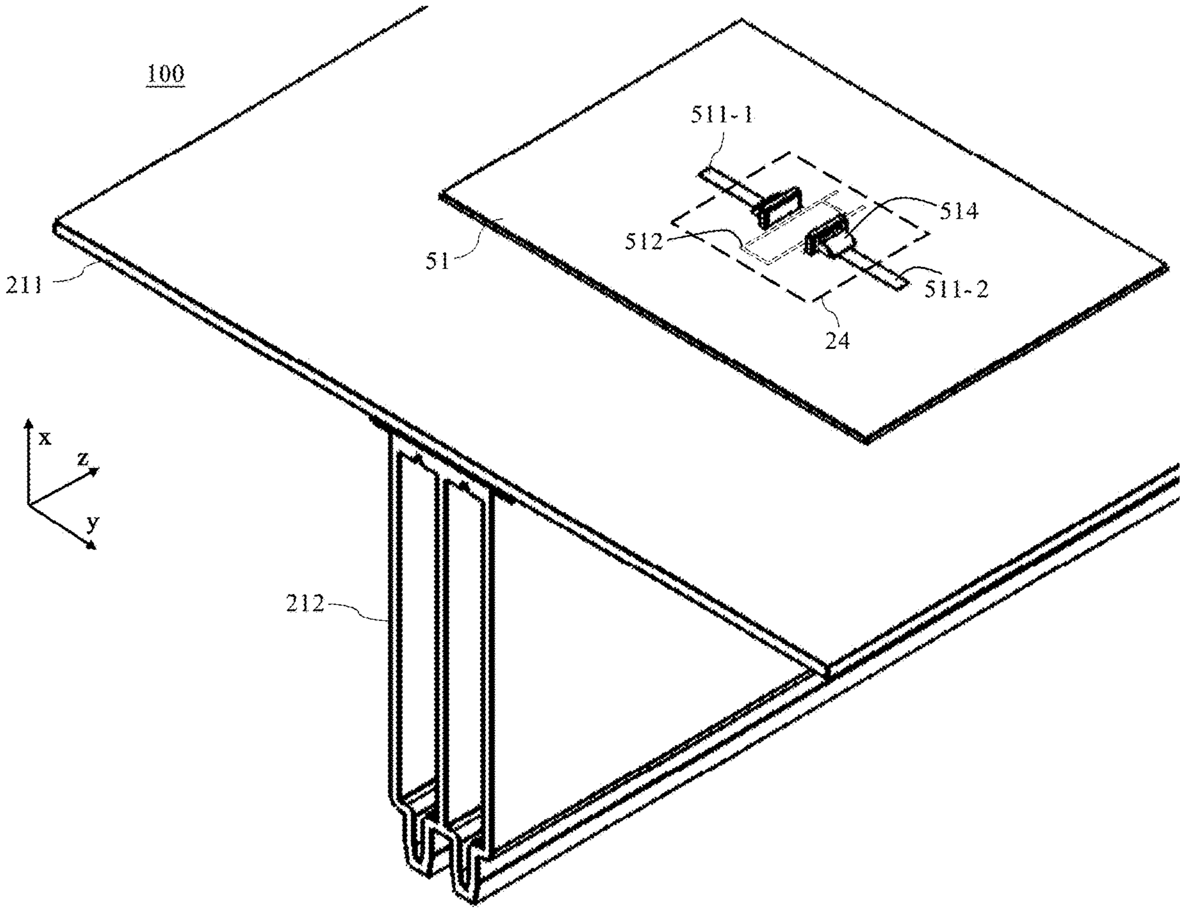
FIG. 6 is a perspective view of a portion of a base station antenna assembly illustrating an opening on a reflector and a structure on a rear surface of a feeder panel, according to an example of the present disclosure.
Figure 8:
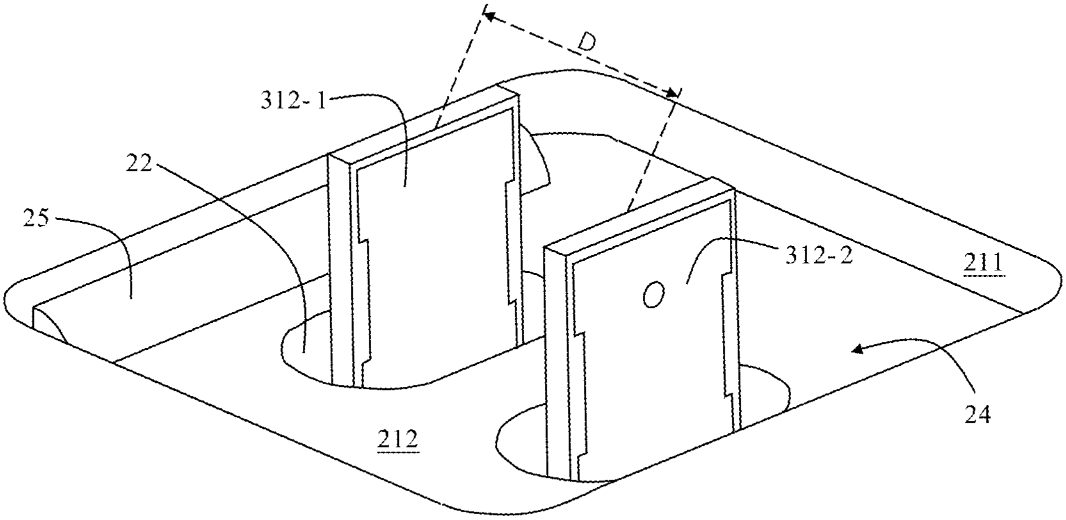
FIG. 8 is a perspective view showing the second portion of the first feed line in the base station antenna assembly of FIG. 6 extending forward of the reflector.
Figure 9:
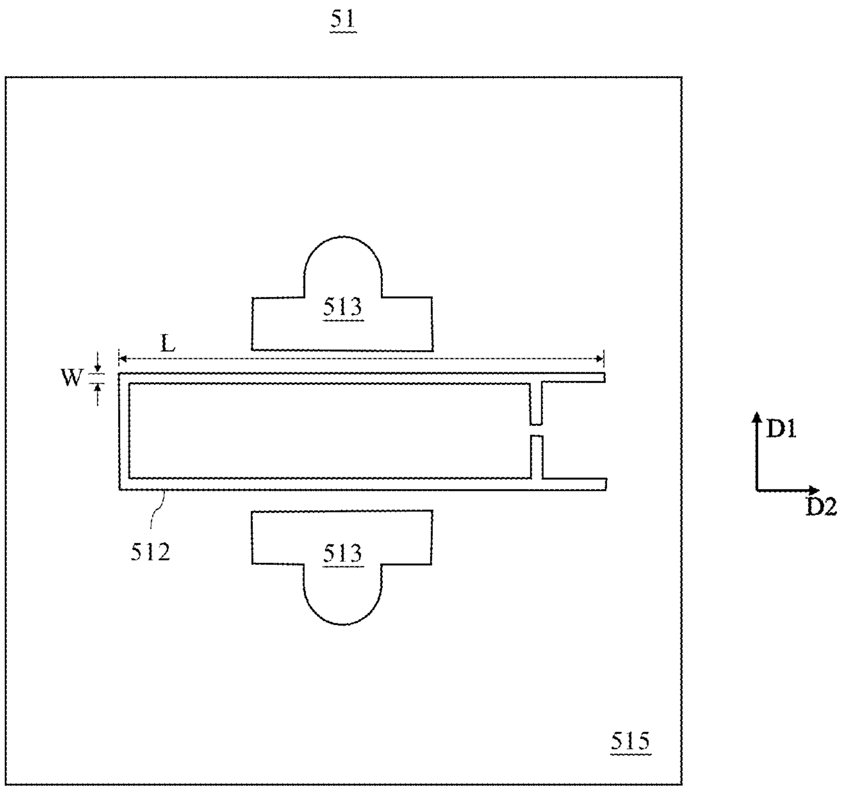
FIG. 9 is a plan view of a rear surface of the feeder panel in the base station antenna assembly of FIG. 6.

An opening 22 is provided in the coupling 21 at the front of the housing element 212 so that the second portion 312 of the conductive wire 310 protrudes from the opening 22 for extension to an exterior (front) of the housing element 212, as shown in FIG. 8. Accordingly, when the second portion 312 of the conductive wire 310 extends to the exterior of the housing element 212, an opening is also provided in the reflector 211, such as the opening 24 shown in FIG. 8, for the second portion 312 of the conductive wire 310 to pass through. Further, at respective locations of the feeder panel 51, an opening, such as the opening 513 shown in FIG. 9, is also provided so that the second portion 312 of the conductive wire 310 passes through and extends into front of the feeder panel 51 as shown in FIG. 5B, FIG. 6, and FIG. 9. A second feed line is formed on the front surface of the feeder panel 51, which is a conductive trace 511 printed on the dielectric substrate in the illustrated example. As shown in FIG. 9, the rear surface of the feeder panel 51 is printed with a conductor plane 515. The conductor plane 515 is capacitively coupled to the reflector 211, such as the feeder panel 51 installed to the front surface of the reflector 211, such that the conductor plane 515 printed on the rear surface thereof is capacitively coupled to the reflector 211 via a solder resistant material coated on the conductor plane 515, such that the conductor plane 515 on the rear surface of the feeder panel 51 is grounded. The grounded conductor plane 515 and the dielectric substrate of the feeder panel 51 are formed with the conductive trace 511 as microstrip transmission lines in order to transmit RF signals to feed the radiator. The conductive trace 511 includes a conductive trace 511-1 for a radiation feeder with a first polarization direction (e.g., inclined +45 degrees relative to the center line) and a conductive trace 511-2 for a radiation feeder with a second polarization direction (e.g., inclined −45 degrees) of the bipolar radiation element. Each conductive trace 511 is coupled to a respective radiator, such as by a feed coupled to the radiation element, to feed to the respective radiator. The second portion 312 of the conductive wire 310 extends forward of the feeder panel 51 and is electrically coupled with the conductive trace 511 on the front surface of the feeder panel 51, such as by welding conductive solder 514, so that the conductive wire 310 can feed an RF signal to the radiator of the radiation element via the conductive trace 511.

As shown in FIG. 8, the second portion 312 of the conductive wire 310 that extends outside of the housing element 212 and continues to protrude forward may emit electromagnetic radiation outward of the second portion 312 of the conductive wire 310 due to the lack of a corresponding ground plane positioned on one or both sides thereof. In this way, the first electromagnetic radiation emitted by the second portion 312-1 of the conductive wire 310-1 for the radiation with the first polarization direction may be coupled to the conductive wire 310-2 for the radiation with the second polarization direction, and the second electromagnetic radiation emitted by the second portion 312-2 of the radiation with the second polarization direction may be coupled to the signal of the conductive wire 310-1 for the radiation with the first polarization direction being fed between the two polarizations of the radiation elements. This is particularly evident in the case where the distance between the second portion 312-1 of conductive wire 310-1 and the second portion 312-2 of conductive wire 310-2 (e.g., distance D in FIG. 5B and FIG. 8) is closer, e.g., where the two housings 23-1 and 23-2 of housing element 212 as shown in FIG. 7 are configured to be adjacent and have a common portion.

FIG. 6 shows the base station antenna assembly 100 in perspective view, according to an example of the present disclosure. In the following description of the base station antenna assembly 100, a detailed description of the same or similar elements as in the base station antenna assembly 200 in the preceding examples is omitted. The base station antenna assembly 100 includes a reflector 211 configured to provide a ground plane, a feeder panel 51 positioned forward of the reflector 211, and a housing element 212 positioned rearward of the reflector 211. The housing element 212 in FIG. 6 is shown in FIG. 7, including a first housing 23-1 and a second housing 23-2. The housing element 212 is capacitively coupled with the ground plane of the reflector 211 such that the first and second housings 23-1 and 23-2 are grounded. It should be understood that the base station antenna assembly 100 may further include a radiator positioned forward of the reflector 211 and forward of the feeder panel 51, including a first and second radiators. In the illustrated example, the first and second radiators may be two polarized radiators for a bipolar radiation element configured to operate within the first band, i.e., to send and receive electromagnetic radiation within the first band. The first band may be, for example, a 1.4-2.8 GHz band or a sub-band thereof. In other examples, the first and second radiators may not be the same radiation element, but rather two different radiation elements, respectively. In such a case, the first radiator may be configured to send and receive electromagnetic radiation within the first frequency band, the second radiator may be configured to send and receive electromagnetic radiation within the second frequency band, and the second frequency band overlaps with the first frequency band within the third frequency band (e.g., the first frequency band overlaps with the second frequency band, in whole or in part). The feeder panel 51 may be implemented as a printed circuit board. The feeder panel 51 includes a dielectric substrate, a conductor plane 515 that is capacitively coupled to a ground plane formed on a rear surface of the dielectric substrate to ground, and a conductive trace 511 formed on a front surface of the dielectric substrate. It should be understood that FIG. 6 illustrates only schematically a portion of conductive traces 511.

A first radio frequency signal is fed to the first radiator through the first feed path for transmission in the first polarization direction of the bipolar radiation element and a second radio frequency signal is fed to the second radiator through the second feed path for transmission in the second polarization direction of the bipolar radiation element. The first feed path includes a first feed line extending from behind the feeder panel 51 to forward of the feeder panel 51 and a second feed line formed on a front surface of a dielectric substrate of the feeder panel 51. A first feed line of the first feed path is implemented as a first conductive wire, e.g., may be a conductive wire 310-1 in the above examples. A second feed line of the first feed path may be implemented as a conductive trace 511-1 formed on the front surface of the feeder panel 51. A first feed line of the first feed path is in electrical connection with a second feed line of the first feed path, such as on the front surface of the dielectric substrate, such that the first conductive line feeds to the first radiator via conductive traces 511-1. The second feed path includes a first section feed line extending from behind the feeder panel 51 to forward of the feeder panel 51 and a second feed line formed on the front surface of the dielectric substrate of the feeder panel 51. A first feed line of the second feed path is implemented as a second conductive wire, e.g., may be a conductive wire 310-2 in the above examples. A second feed line of the first feed path may be implemented as conductive traces 511-2 formed on the front surface of the feeder panel 51. A first feed line of the second feed path and a second feed line of the second feed path are electrically connected, e.g., on the front surface of the dielectric substrate such that the second conductive line is fed to the second radiator via conductive traces 511-2.

A first feed line of the first feed path (hereinafter "first conductive wire") includes a first portion positioned (or housed) inside the grounded first housing 23-1 such that the first housing 23-1 and the first portion of the first conductive wire form a first stripline transmission line. The first conductive wire also includes an opening 22 extending outside of the first housing 23-1 and across the housing element 212 (opening 22 through the coupling 21 of a chamber formed by a cover housing located on the front of the housing element 212), an opening 24 on the reflector 211 (opening 24 extends through the reflector 211 at the housing's second portion 312) and an opening 513 on the feeder panel 51 (opening 513 extends through the feeder panel 51 at the housing 23 forward of the feeder panel). The second portion 312-1 may be soldered (e.g., via conductive solder 514) at a front surface of the feeder panel 51 to a first end of the conductive trace 511-1 adjacent the opening 513 in order to feed the first radiator through the conductive trace 511-1. A first feed line of the second feed path (hereinafter also referred to as a "second conductive wire") includes a first portion positioned (or housed) inside the grounded second housing 23-2 such that the first portion of the second housing 23-2 and the second conductive wire forms a second stripline transmission line. The second conductive wire also includes a second portion 312-2 extending outside of the second housing 23-2 and through the opening 22 on the housing element 212, the opening 24 on the reflector 211, and the opening 513 on the feeder panel to the front of the feeder panel 51. The second portion 312-2 may be soldered to a first end of the adjacent opening 513 of the conductive traces 511-2 at a front surface of the feeder panel 51 in order to feed a second radiator via the conductive traces 511-2.

The base station antenna assembly 100 also includes a decoupling unit positioned in front of the reflector 211 and positioned between the second portion 312-1 of the first conductive wire and the second portion 312-2 of the second conductive wire. The decoupling unit is configured such that decoupling occurs between the second portion 312-1 of the first conductive wire and the second portion 312-2 of the second conductive wire. Where the first and second radiators are two polarized radiators of a bipolar radiation element operating within the first frequency band, the first conductive wire transmits a first RF signal within the first frequency band for the first and the second conductive wires transmits a second RF signal within the first frequency band for the second. At this point, the decoupling unit is configured such that the decoupling is between the second portion 312-1 of the first and second portions 312-2 of the first conductive wire within the first frequency band. In the case of two separate emitters operating within the first and second frequency bands, respectively, the first and second emitters (where the second and first frequency bands overlap within the third frequency band), the first and second RF signals transmitted on the first and second conductive wires are within the first and second RF signals for the second radiator. At this point, the decoupling unit is configured such that the second portion 312-1 of the first conductive wire and the second portion 312-2 of the second conductive wire are decoupled at least within the third frequency band.

In the illustrated example, the decoupling unit is implemented as a gap resonator. The gap resonator includes a conductor plane and a gap formed in the conductor plane. In the illustrated example, the conductor plane of the gap resonator is a grounded conductor plane 515 formed on the rear surface of the feeder panel 51 and a gap 512 is formed in the conductor plane 515. The gap 512 in the conductor plane 515 of the feeder panel 51 to form a gap resonator as a decoupling unit may reuse the existing structure in the base station antenna to add a decoupling unit without adding additional elements. In this instance, the conductive trace 511 formed on the front surface of the feeder panel 51 as the feed path requires a gap 512 (in the front plan view of the base station antenna assembly 100).

The gap resonator is configured to resonate at a first frequency (e.g., a resonant frequency having a first frequency). Where the first and second emitters are two polarized emitters of a bipolar radiation element operating within the first frequency band, the gap resonator is configured to resonate within the first frequency band thereof. With the first and second radiation emitters operating within the first and second frequency bands, respectively, two separate emitters (where the second and first bands overlap within the third band), the gap resonator is configured to resonate within the third band. As shown, the gap resonator is positioned between the second portion 312-1 of the first conductive wire and the second portion 312-2 of the second conductive wire. Optionally, the decoupling unit is disposed closer to the reflector 211 in the thickness direction of the base station antenna (the direction of the x-axis) such as the distance between the rear surface of the decoupling unit and the front surface of the reflector 211 is less than the thickness of the reflector 211. In the illustrated example, the gap resonator is disposed on a rear surface of the feeder panel 51.

A gap resonator is positioned between the second portion 312-1 of the first conductive wire and the second portion 312-2 of the second conductive wire such that the gap resonator may be both an energy incentive radiated by the second portion 312-1 of the first conductive wire and an energy incentive radiated by the second portion 312-2 of the second conductive wire. The length L of the gap 512 (as shown in FIG. 9) and the width W (as shown in FIG. 9) may be configured as desired. The length L of the gap 512 affects the resonant frequency of the gap resonator, and the width W of the gap 512 affects the amplitude and bandwidth of the gap resonator. A gap resonator may be configured such that electromagnetic radiation emitted by the gap resonator itself due to the energy excitation radiated by the second portion 312-1 of the first conductive wire offsets each other substantially in reverse phase upon reaching the second portion 312-1 of the second conductive wire; and causes the electromagnetic radiation emitted by the gap resonator itself due to the energy excitation radiated by the second portion 312-2 of the second conductive wire offsets each other substantially in reverse phase upon reaching the second portion 312-1 of the first conductive wire.

In this way, the gap resonator can be configured such that the second portion 312-1 of the first conductive wire and the second portion 312-2 of the second conductive wire are decoupled to improve isolation performance between the first and second radiators.

It should be understood that in other examples, the decoupling unit may also be implemented in forms other than a gap resonator. For example, the decoupling unit may include a radiator having a first resonant frequency that is both within an operating frequency band of the first radiator and within an operating frequency band of the second radiator. The radiator may be both stimulated by the energy radiated by the second portion 312-1 of the first conductive wire and stimulated by the energy radiated by the second portion 312-2 of the second conductive wire. This may result in the electromagnetic radiation coupled to each other between the second portion 312-1 of the first conductive wire and the second portion 312-2 of the second conductive wire being counteracted or reduced by the configuration of the radiation, thereby being decoupled between the second portion 312-1 of the first conductive wire and the second portion 312-2 of the second conductive wire.

Figure 10:
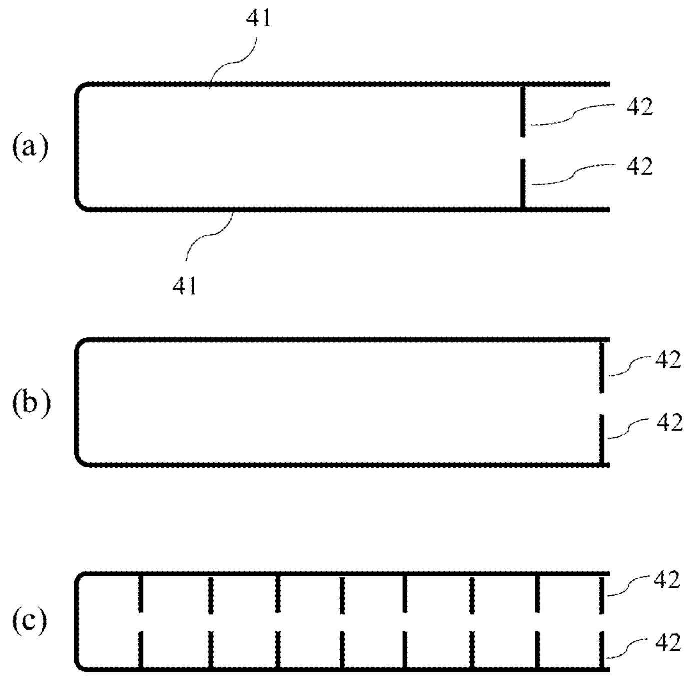
FIG. 10 is a schematic diagram of a gap in a feeder panel in a base station antenna assembly, according to an example of the present disclosure.
Figure 11:
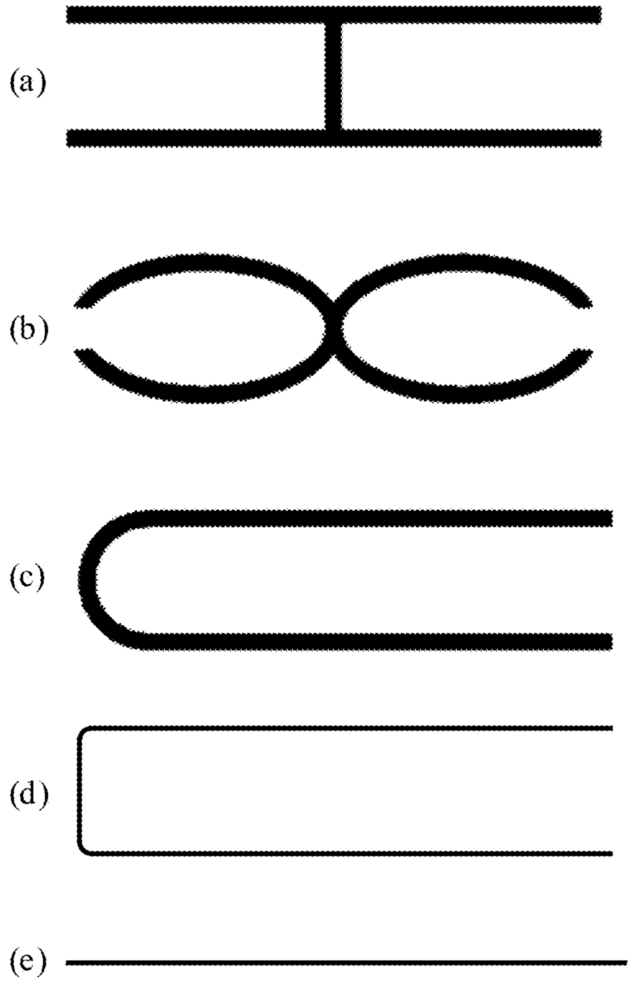
FIG. 11 is a schematic diagram of a gap in a feeder panel in a base station antenna assembly, according to an example of the present disclosure.

The gap resonator includes a gap 512 extending between the second portion 312-1 of the first conductive wire and the second portion 312-2 of the second conductive wire. In the illustrated example, the second portion 312-1 of the first conductive wire and the second portion 312-2 of the second conductive wire are opposite in a first direction (e.g., the D1 direction) and the gap 512 extends in a second direction perpendicular to the first direction (e.g., the D2 direction) in the conductor plane 515. With the gap resonator implemented to include the gap 512 formed in the conductor plane 515 on the rear surface of the feeder panel 51, a schematic plan view of the rear surface of the feeder panel 51 is shown in FIG. 9. The two openings 513 through the feeder panel 51 for causing the conductive wire 310 to pass are opposite in a first direction and the gap 512 extends between the two openings 513 in a second direction perpendicular to the first direction. The shape of the gap 512 in the example shown in FIGS. 6 and 9 is shown in (a) of FIG. 10, including a U-shaped gap trunk 41 extending in a second direction and a pair of branches 42 extending in a first direction oppositely. The extension direction of the gap branch 42 is substantially perpendicular to the extension direction of the gap trunk 41. It should be understood that the shape of the gap trunk 41 is not limited to a U-shaped, for example, may be a straight line gap (as shown in (e) in FIG. 11), a U-shaped gap (as shown in (c) and (d) in FIG. 11), a dual U-shaped gap (as shown in (a) in FIG. 11), a C-shaped gap (half of the gaps as shown in (e) in FIG. 11), etc. The number and form of gap branches 42 are also not limited to a pair of gap branches 42 that extend oppositely in a first direction. For example, one gap branch 42 (rather than a pair of gap branches 42) may be provided on only one gap trunk 41 (rather than on the opposite two gap trunks 41). The two gap branches 42 that are relative to the settings may also not be positive opposites, for example, the positions of the two gap branches 42 in the second direction may be different. The gap branches 42 may be disposed at the end of the gap trunk 41 (as shown in (b) in FIG. 10) or at the middle of the gap trunk 41 (as shown in (a) in FIG. 10). A plurality of pairs of gap branches 42 may be included as shown in (c) in FIG. 10. The two of each pair of gap branches 42 of the plurality of pairs of gap branches 42 may be opposite (as shown) or may be staggered (not shown). Further, the gap branch 42 may also include further extended sub-branches (not shown), e.g., the middle or end of the gap branch 42 may include sub-branches extending in a second direction. The placement of the gap branch 42 helps to reduce the size of the gap 512 in the first direction and/or the second direction, thereby saving it an occupied area on the feeder panel 51.

Figure 12:
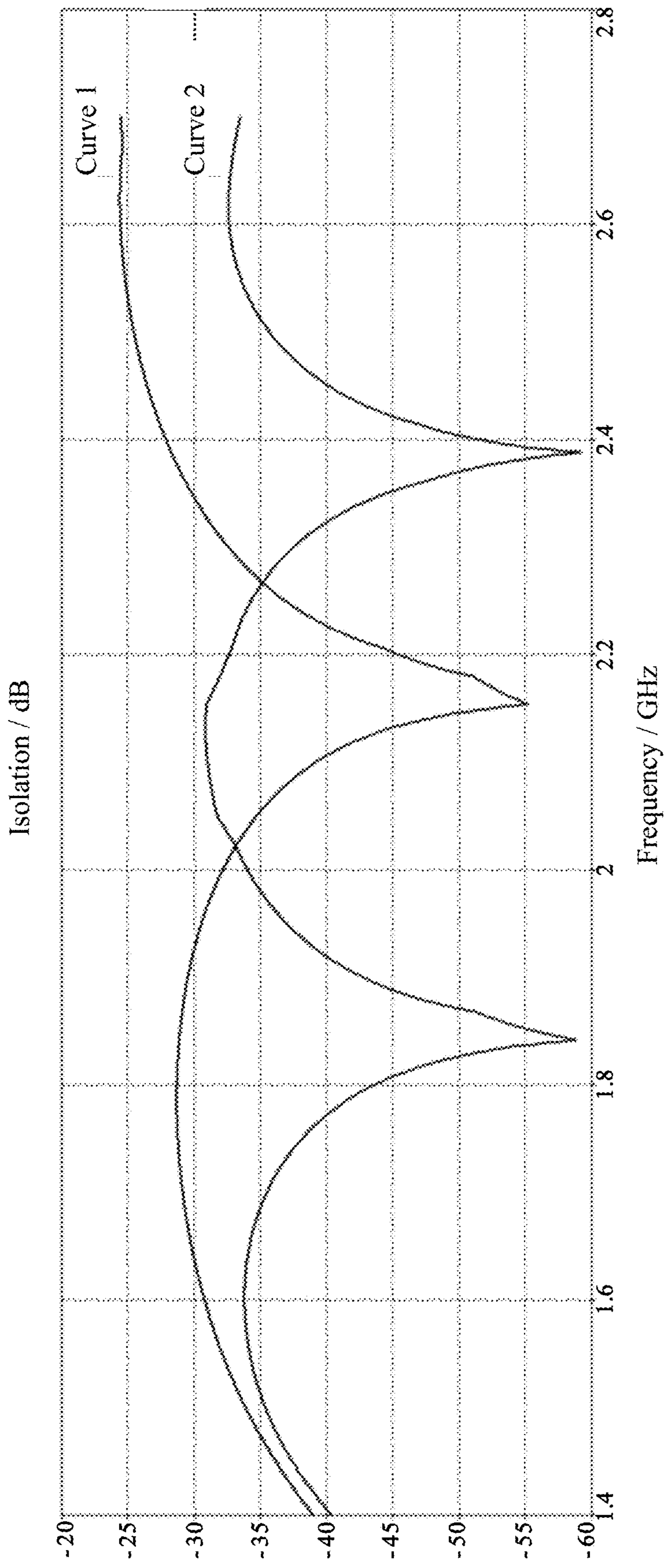
FIG. 12 shows an isolation curve between the two polarizations when the base station antenna assembly of FIG. 6 is used to feed the cross-dipole radiation element and the isolation curve between the two polarizations when the base station antenna assembly of FIG. 9 is used to feed the cross-dipole radiation element.

FIG. 12 shows a profile (Curve 2) of the degree of isolation between two polarizations when the base station antenna assembly 100 of FIG. 6 is used to feed cross-dipole radiation elements as a function of frequency and a profile (Curve 1) of the degree of isolation between two polarizations when the cross-dipole radiation element is not provided with the decoupled unit as described above. As can be seen, the base station antenna assembly 100 including the decoupling unit as shown in FIG. 6 may improve the isolation between the two polarizations of the cross-dipole radiation element to be less than −30 dB in a frequency range of 1.4-2.7 GHz.

Although some specific examples of the present disclosure have been described in detail by examples, those skilled in the art should understand that the above examples are only for illustration, not for limiting the scope of the present disclosure. The examples disclosed herein can be combined arbitrarily without departing from the spirit and scope of the present disclosure. Those skilled in the art should also understand that various modifications can be made to the examples without departing from the scope and spirit of the present disclosure. The scope of the present disclosure is defined by the Claims attached.

What is claimed is:

1. A base station antenna assembly, comprising:

a reflector configured to provide a ground plane;

a first radiator positioned forward of the reflector, the first radiator being configured to send and receive electromagnetic radiation within a first frequency band;

a second radiator, positioned forward of the reflector, the second radiator configured to send and receive electromagnetic radiation within a first frequency band;

a first feed path configured to feed a first radio frequency signal to a first radiator, the first feed path comprising a first feed line extending from a rearward portion of the reflector to a forward portion of the reflector;

a second feed path configured to feed a second radio frequency signal to a second radiator, the second feed path including a first feed line extending from a rearward portion of the reflector to a forward portion of the reflector; and a gap resonator positioned between portions of a first segment of a feed line extending forward of the reflector and portions of a first segment of a second feed path extending forward of the reflector, the gap resonator configured to resonate at a first frequency, wherein the first frequency is within a first frequency band.

2. The base station antenna assembly according to claim 1, further comprising:

a feeder panel positioned between the reflector and the first and second radiators, the feeder panel including a dielectric substrate and a conductor plane formed on a rear surface of the dielectric substrate that is capacitively coupled with the ground plane, wherein a first feed line of the first feed path also passes through and extends forward of the feeder panel, and a first feed line of the second feed path also passes through and extends forward of the feeder panel, and the gap resonator includes a gap formed in the conductor plane.

3. The base station antenna assembly according to claim 2, wherein, a first feed path further comprising a second feed line formed on a front surface of the dielectric substrate, the first feed line of the first feed path being in current connection with a second feed line of the first feed path on the front surface of the dielectric substrate; and a second feed path further includes a second feed line formed on a front surface of the dielectric substrate, the first feed line of the second feed path being in current connection with a second feed line of the second feed path on the front surface of the dielectric substrate.

4. The base station antenna assembly according to claim 2, wherein, a portion of a first feed line of the first feed path extending forward of the feeder panel and a portion of a first feed line of the second feed path extending forward of the feeder panel in a first direction, and the gap extends in a second direction perpendicular to the first direction.

5. The base station antenna assembly of claim 2, wherein the gap includes one or more gap branches extending in a first direction.

6. The base station antenna assembly according to claim 1, further comprising:

a first housing positioned rearward of the reflector and capacitively coupled with the ground plane, the first housing being configured to house a first portion of a first feed line of a first feed path inside the first housing and the first feed path such that a first portion of a first feed line forms a first stripline transmission line;

a second housing positioned rearward of the reflector and capacitively coupled with the ground plane, the second housing being configured to house a first portion of a first feed line of a second feed path inside the first housing and a first feed line of a second feed path, such that a first portion of the second housing and a second feed path form a second stripline transmission line, wherein a second portion of a first feed line of the first feed path extends from inside a first housing, through the reflector, and into front of the reflector; and a second portion of the first feed line of the second feed path protrudes from within the second housing, passes through the reflector and extends forward of the reflector.

7. The base station antenna assembly of claim 1, wherein a first radiator has a first polarization direction and a second radiator has a second polarization direction orthogonal to the first polarization direction.

8. A base station antenna assembly, comprising:

a grounded reflector;

a grounded first housing positioned rearward of the reflector;

a grounded second housing positioned rearward of the reflector;

a first conductive wire including a first portion positioned inside the first housing and a second portion extending outside the first housing, the first portion of the first conductive wire being configured to form a first stripline transmission line with the first housing;

a second conductive wire comprising a first portion positioned inside the second housing and a second portion extending outside the second housing, the first portion of the second electrically conductive wire being configured to form a second stripline transmission line with the second housing; and a feeder panel positioned in front of the reflector, the feeder panel including a dielectric substrate and a grounded conductor plane formed on a rear surface of the dielectric substrate, wherein a second portion of a first conductive wire passes through the reflector and the feeder panel and extends forward of the feeder panel, a second portion of a second conductive wire passes through the reflector and the feeder panel and extends forward of the feeder panel, and the conductor plane forms a gap between the second portion of the first conductive wire and the second portion of the second conductive wire.

9. The base station antenna assembly according to claim 8, wherein, a second portion of the first conductive wire and a second portion of the second conductive wire are opposite in a first direction, and the gap extends in a second direction perpendicular to the first direction.

10. The base station antenna assembly of claim 8, wherein the feeder panel further comprises conductive traces formed on a front surface of the dielectric substrate that avoid the gap in a front plan view of the base station antenna assembly.

11. The base station antenna assembly of claim 8, wherein the first housing and the second housing are adjacent.

12. The base station antenna assembly of claim 8, wherein the first housing and the second housing are configured as integral parts and the first housing and the second housing include a common portion.

13. The base station antenna assembly of claim 8, wherein the first housing and the second housing are capacitively coupled with the ground plane.

14. The base station antenna assembly according to claim 8, further comprising:

a first radiator positioned forward of the reflector and having a first polarization direction, the first radiator being configured to send and receive electromagnetic radiation within a first frequency band; and a second radiator positioned forward of the reflector and having a second polarization direction orthogonal to the first polarization direction, the second radiator being configured to send and receive electromagnetic radiation within a first frequency band, wherein the feeder panel further comprises a conductive trace formed on a front surface of the dielectric substrate, the first conductive wire being fed to a first radiator via the conductive trace, and the second conductive wire being fed to a second radiator via the conductive trace, and the gap is configured to resonate at a first frequency, wherein a first frequency is located within a first frequency band.

15. A base station antenna assembly, comprising:

a reflector configured to provide a ground plane;

a first radiator positioned forward of the reflector, the first radiator being configured to send and receive electromagnetic radiation within a first frequency band;

a second radiator, positioned forward of the reflector, the second radiator configured to transmit and receive electromagnetic radiation within a second frequency band, the second frequency band overlapping with a first frequency band within a third frequency band;

a grounded first housing positioned rearward of the reflector;

a grounded second housing positioned rearward of the reflector;

a first conductive wire for feeding to a first radiator, including a first portion positioned inside the first housing and extending outside the first housing and through the reflector to a second portion forward of the reflector, the first conductive wire being configured to form a stripline transmission line with the first housing;

a second conductive wire for feeding to a second radiator, including a first portion positioned inside the second housing and extending outside the second housing and through the reflector to a second portion forward of the reflector, the first portion of the second conductive wire being configured to form a second stripline transmission line with the second housing; and a decoupling unit positioned in front of the reflector and positioned between the second portion of the first conductive wire and the second portion of the second conductive wire, the decoupling unit being configured such that at least within a third frequency band decoupling between the second portion of the first conductive wire and the second portion of the second conductive wire.

16. The base station antenna assembly of claim 15, wherein a distance between a rear surface of the decoupling unit and a front surface of the reflector is less than a thickness of the reflector.

17. The base station antenna assembly of claim 15, wherein the decoupling unit comprises a radiator configured to resonate at a first frequency, wherein the first frequency is located within a third frequency band.

18. The base station antenna assembly of claim 15, wherein the decoupling unit comprises a gap formed in a conductor plane, the gap being configured to resonate at a first frequency, wherein the first frequency is located within a third frequency band.

19. The base station antenna assembly of claim 15, wherein the first housing and the second housing are adjacent.

20. The base station antenna assembly of claim 15, wherein the first housing and the second housing are configured as integral parts and the first housing and the second housing include a common portion.

21. The base station antenna assembly of claim 15, wherein the first housing and the second housing are capacitively coupled with the ground plane.

* * * * *